United States Patent [19]

Culp

[11] 4,194,260
[45] Mar. 25, 1980

[54] ROTARY CLEANING DEVICE

[76] Inventor: Harry L. Culp, R.R. No. 1, Vineland, Ontario, Canada, L0R 2C0

[21] Appl. No.: 24,124

[22] Filed: Mar. 26, 1979

[51] Int. Cl.² ............................................... B05C 1/00
[52] U.S. Cl. ................................................. 15/230.14
[58] Field of Search ............ 15/179, 183, 230, 230.14, 15/230.16; 29/121.5, 124, 129

[56] References Cited

U.S. PATENT DOCUMENTS

| | | | |
|---|---|---|---|
| 1,011,323 | 12/1911 | Courtney | 15/230.14 |
| 2,821,819 | 2/1958 | Bernstein | 51/193.5 |
| 3,237,276 | 3/1966 | Von der Ohe | 29/121.5 |
| 3,715,773 | 2/1973 | Drumm | 15/183 |
| 4,018,014 | 4/1977 | Belanger | 15/230.14 X |

*Primary Examiner*—Leonard D. Christian
*Attorney, Agent, or Firm*—Hirons, Rogers & Scott

[57] ABSTRACT

A new rotary cleaning device especially suited for cleaning dirt and debris from conveyors consists of one or more pluralities of T-shaped members mounted around a central mandrel with the cross-bars touching the mandrel exterior surface and providing respective circumferentially-extending shoulders spaced from the mandrel face. The mandrel is provided with radially-extending apertured plates between which the T-shaped members extend, the plate apertures receiving retainer bars which engage the shoulders of the T-shaped members. The assembly is locked together by axially movable wedges inserted between each retainer bar and the edge of the aperture through which the bar passes. Preferably the cleaner members are integral T-shaped pieces of resilient material, such as neoprene. Each wedge has a step face to determine its maximum insertion into the respective aperture.

6 Claims, 5 Drawing Figures

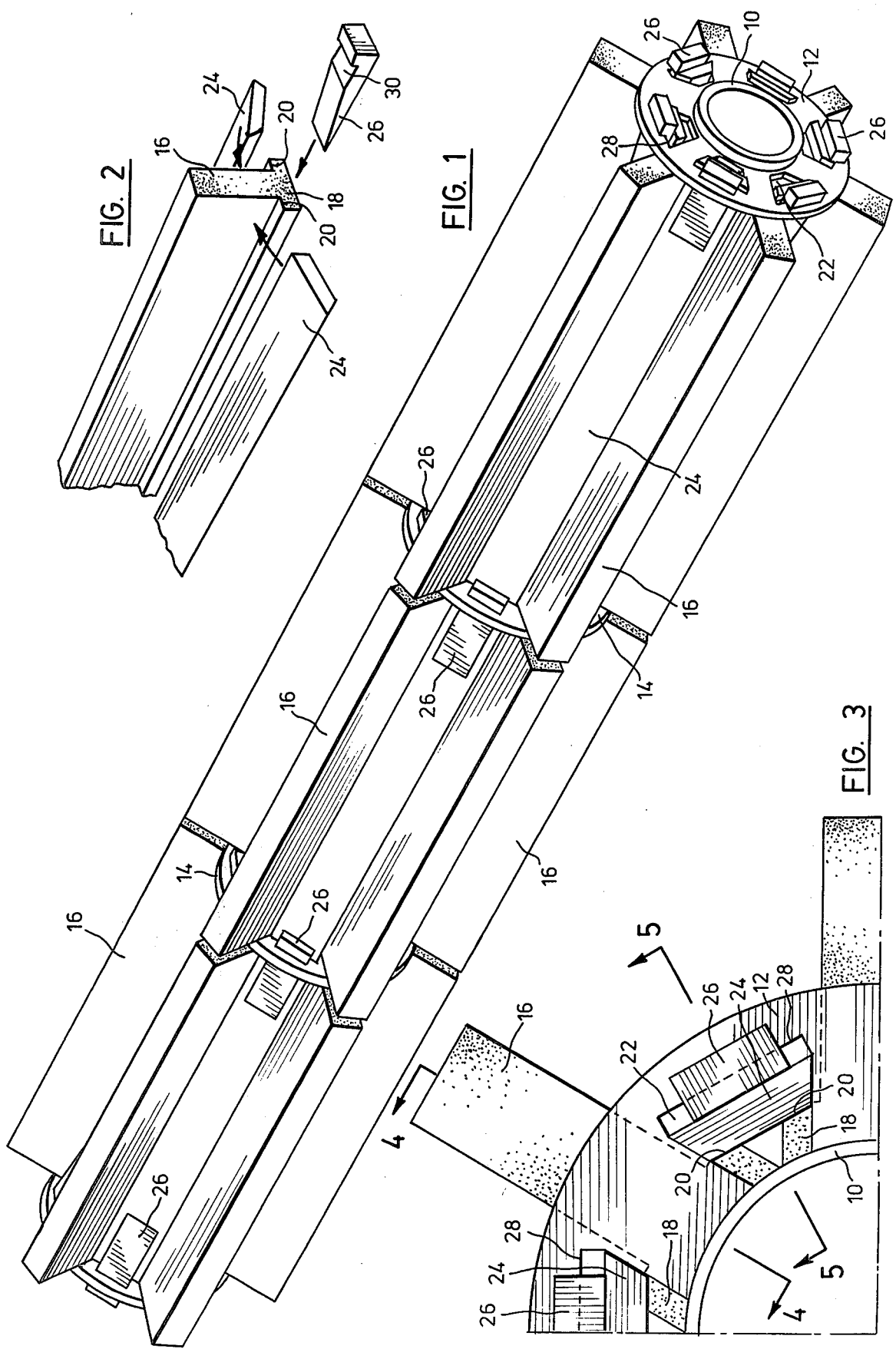

ROTARY CLEANING DEVICE

FIELD OF THE INVENTION

This invention is concerned with improvements in or relating to rotary cleaning devices and especially, but not exclusively, to such devices intended for cleaning the surface of a conveyor belt.

REVIEW OF THE PRIOR ART

A novelty search was carried out prior to the preparation of this application in the public search records of the U.S. Patent Office and in the following classes:

Class 15: Brushing scrubbing and cleaning
Subclass 179—Brush or broom type constructed for rotation.
Subclass 183—Brush or broom axially arranged held by bars.
Class 29: Metal Working
Subclass 121.5—Rolls or rollers with axially aligned elements As a result of this search the following U.S. Patent specifications were examined, but are believed not to be pertinent to this invention as defined in the claims.

From 15/179—None
From 15/183—Nos. 2,767,418; 2,734,212; 3,715,773, and 3,237,276.
From 29/121.5—Nos. 2,647,619; 3,239,747; and 3,304,253.

The provision of a cleaning device for cleaning continuous conveyors presents a number of difficulties, principally flowing from the arduous conditions under which the devices are expected to work and the rapid rate of wear to which they are subjected. There is a wish therefore to economise in their construction since they wear so rapidly, and yet it is important that the device clean effectively, since otherwise there is the possibility that the much more expensive conveyor will become clogged and/or damaged by the unbrushed material remaining on it.

DEFINITION OF THE INVENTION

It is therefore an object of the invention to provide a rotary cleaning device of new form that can readily be assembled and disassembled for replacement of worn cleaning members.

In accordance with the present invention there is provided a rotary cleaning device comprising:

(a) a central longitudinal cylindrical mandrel adapted for mounting the device to rotate about the longitudinal axis of the mandrel;

(b) at least two spaced radial members mounted on the mandrel and extending radially therefrom and having retainer-receiving openings therein;

(c) a plurality of radially outwardly extending cleaning members disposed around the circumference of the mandrel and extending between the said two radial members;

(d) each cleaning member having along its length on opposite sides thereof circumferentially extending portions providing respective circumferentially extending shoulders spaced from the mandrel surface;

(e) two retainer members, each disposed between each two immediately adjacent cleaning members with its ends engaged in the said retainer-receiving openings of the two spaced radial members, and engaging the respective cleaning member shoulder, and (f) a pair of axially-movable wedge members each engageable in a respective one of the said retainer-receiving openings to hold the retainer member in the opening and to urge the retainer member into retaining engagement with the engaged cleaning member shoulder.

DESCRIPTION OF THE DRAWINGS

A rotary cleaning device that is a particular preferred embodiment of the invention will now be described, by way of example, with reference to the accompanying diagrammatic drawings, wherein:

FIG. 1 is a perspective view of the device taken from above,

FIG. 2 is a perspective view of part of one of the cleaning members of the device of FIG. 1, to illustrate the manner in which it is assembled into the device and retained therein, FIG. 3 is a part end view of the device of FIG. 1, showing a 90° segment thereof.

DESCRIPTION OF THE PREFERRED EMBODIMENTS

Figure 5:
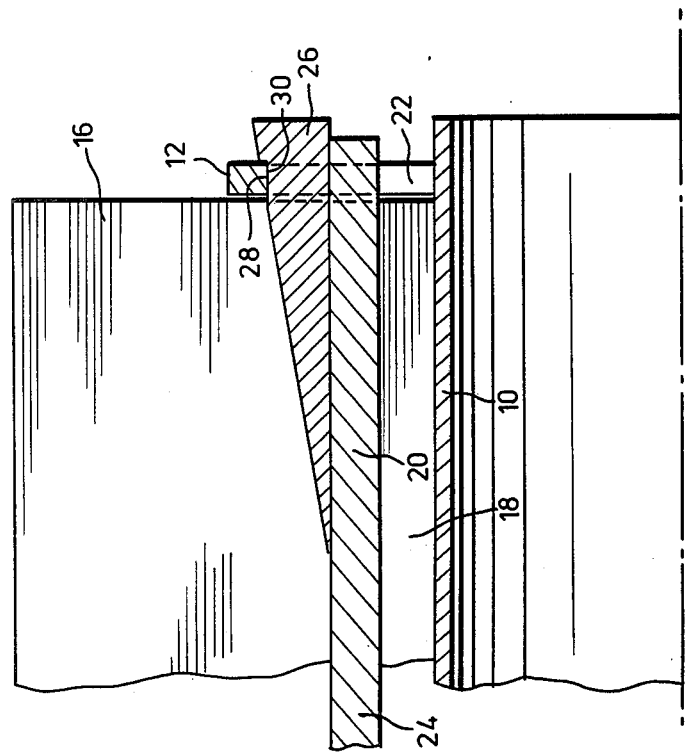
FIGS. 4 and 5 are sections taken respectively on the lines 4—4 and 5—5 of FIG. 3.
Figure 4:
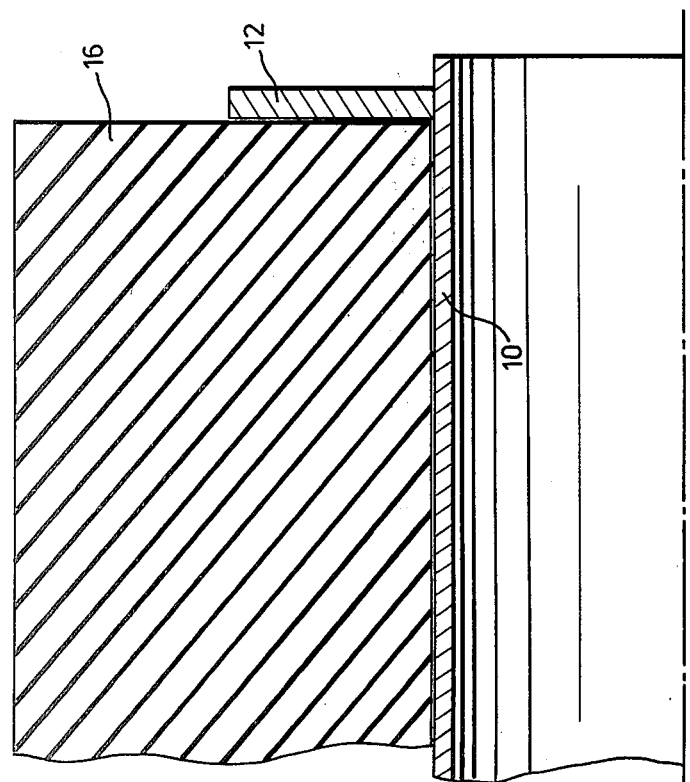

The cleaning device particularly described and illustrated herein is intended for use in cleaning from the under-run of a conveyor any dirt and other debris that has remained thereon after discharge of the conveyed material from the conveyor. The manner in which the device is mounted and rotated for this purpose will be readily apparent to those skilled in the art and forms no part of the present invention, so that illustration thereof is not required.

The device of the invention consists therefore of a hollow central longitudinal cylindrical mandrel 10 which can be mounted on a drive shaft (not shown) for rotation therewith. In this embodiment there are provided two end radial members 12 and two intermediate radial members 14, all mounted on the mandrel 10 to extend radially therefrom, the intermediate members being spaced equally from one another and from the end members. A cleaning member of the smallest length will be provided with only two end members, the next longest will have a single intermediate member, and so on. The radial members are fastened securely to the mandrel, as by welding.

The cleaning members which engage the conveyor surface consist of a number of pluralities of radially-extending, generally T-shaped members 16, one plurality between each two immediately-adjacent radial members, disposed with the cross-bars 18 of the T's in contact with the cylindrical exterior surface of the mandrel, the lengths of the cross-bars being such that they will just touch one another, as is seen in FIG. 3. The lengths of the members are such that they extend the full length of the space between the two radial members and the said cross-bars provide respective circumferentially-extending shoulders 20 spaced from the mandrel exterior surface.

The radial members are provided with sets of registering apertures 22, one aperture between each two members 16, and the registering apertures receive therein a respective elongated retainer bar member 24 which engages the shoulders 20 of the adjacent cleaner members to retain the members on the mandrel. The retainer bars are of truncated triangular cross-section and the apertures 22 are of corresponding shape to the bars. The device is completed by a number of wedge members 26, each fitting within one of the apertures 22 between the retainer bar member 24 and the outermost edge 28 of the aperture 22. The wedges are moved axially of the mandrel, and each is provided on its sloping face with a step face 30 determining the maximum effective thickness of the wedge that can be inserted into the opening and therefore the final radial position of the retainer bar 24.

In operation of the invention each cleaning device is quickly assembled from its component parts by placing the T-shaped members on the mandrel, placing the retainer bars on the shoulders and engaged in the apertures 22, and then hammering the wedges 26 into position until their respective step faces 30 are engaged with the aperture edges 28. The cleaning members are of resilient material, such as a synthetic rubber or neoprene, and the cross bars of the T-shaped members are compressed between the retainer bars and the mandrel, so that the wedges are locked firmly in place. When the cleaning members inevitably become too worn for useful service the device is quickly disassembled by knocking out the wedge members 26 and then reassembled using new members.

In other forms of the device the radially-extending portions of the cleaning members can be of other construction than integral resilient material, and the portions providing the shoulders need not be entirely of resilient material, as long as the thickness of the resilient portion is sufficient to provide the necessary retention of the wedge members in their apertures.

It will be seen therefore that I have provided a new cleaning device of simple form that is easily assembled and disassembled for replacement of the cleaning members when worn, using only simple tools, and yet will remain tightly assembled under the arduous conditions encountered in industrial applications.

I claim:

1. A rotary cleaning device comprising:
   (a) a central longitudinal cylindrical mandrel adapted for mounting the device to rotate about the longitudinal axis of the mandrel;
   (b) at least two spaced radial members mounted on the mandrel and extending radially therefrom and having retainer-receiving openings therein;
   (c) a plurality of radially outwardly extending cleaning members disposed around the circumference of the mandrel and extending between the said two radial members;
   (d) each cleaning member having along its length on opposite sides thereof circumferentially extending portions providing respective circumferentially extending shoulders spaced from the mandrel surface;
   (e) two retainer members, each disposed between each two immediately adjacent cleaning members with its ends engaged in the said retainer-receiving openings of the two spaced radial members, and engaging the respective cleaning member shoulder, and
   (f) a pair of axially-movable wedge members each engageable in a respective one of the said retainer-receiving openings to hold the retainer member in the opening and to urge the retainer member into retaining engagement with the engaged cleaning member shoulder.

2. A device as claimed in claim 1, wherein each of the said cleaning members is of approximate T cross-section and is of resilient rubber material.

3. A device as claimed in claim 1, and including two end radial members and at least one intermediate radial member mounted on the mandrel between the said two end members, the device having corresponding pluralities of cleaning members with each plurality extending between the respective two radial members, the retainer members being of a length to extend between the two end members and through the intermediate member or members.

4. A device as claimed in claim 2, and including two end radial members and at least one intermediate radial member mounted on the mandrel between the said two end members, the device having corresponding pluralities of cleaning members with each plurality extending between the respective two radial members, the retainer members being of a length to extend between the two end members and through the intermediate member or members.

5. A device as claimed in claim 1, wherein each radial member is a circular disc and the apertures therein are of truncated triangular shape, and wherein the retainer members are each of mating truncated triangular cross-section.

6. A device as claimed in claim 1, wherein each wedge member is provided on a sloping face thereof with a step surface determining the maximum effective thickness of the wedge that can be inserted into the respective opening.

* * * * *